US012516792B2

(12) United States Patent
Dai et al.

(10) Patent No.: US 12,516,792 B2
(45) Date of Patent: Jan. 6, 2026

(54) LIGHTING FIXTURE WITH MOISTURE RESISTANT AND ADJUSTABLE ILLUMINATION ARRANGEMENT

(71) Applicant: Jiangsu Dalite Electrical Technology Co., Ltd., Jiangsu (CN)

(72) Inventors: Xiaosu Dai, Jian (CN); Haijin Zhu, Changzhou (CN)

( * ) Notice: Subject to any disclaimer, the term of this patent is extended or adjusted under 35 U.S.C. 154(b) by 0 days.

(21) Appl. No.: 18/617,405

(22) Filed: Mar. 26, 2024

(65) Prior Publication Data

US 2025/0305660 A1 Oct. 2, 2025

(51) Int. Cl.

| | |
|---|---|
| ***F21V 14/06*** | (2006.01) |
| ***F21V 5/04*** | (2006.01) |
| ***F21V 17/12*** | (2006.01) |
| ***F21V 31/00*** | (2006.01) |
| ***F21Y 115/10*** | (2016.01) |

(52) U.S. Cl.

CPC ................ *F21V 14/06* (2013.01); *F21V 5/04* (2013.01); *F21V 17/12* (2013.01); *F21V 31/005* (2013.01); *F21Y 2115/10* (2016.08)

(58) Field of Classification Search

CPC . F21V 14/06; F21V 5/04; F21V 17/12; F21V 31/005; F21Y 2115/10

See application file for complete search history.

(56) References Cited

U.S. PATENT DOCUMENTS

2022/0252244 A1* 8/2022 Erdener ................ F21V 23/007

* cited by examiner

*Primary Examiner* — Anne M Hines
*Assistant Examiner* — Jose M Diaz
(74) *Attorney, Agent, or Firm* — Tsz Lung Yeung

(57) ABSTRACT

A lighting fixture includes a main housing, a plurality of illuminating elements mounted in the receiving cavity of the main housing and a moisture resistant and adjustable illumination arrangement. The moisture resistant and adjustable illumination arrangement includes a lens assembly comprising at least one optical lens positioned corresponding to that of the illuminating elements such that the light beams from the illuminating elements are arranged to pass through the optical lens. The lens assembly is mounted in the receiving cavity of the main housing in a rotatably movable manner such that by rotating the lens assembly with respect to the main housing, a vertical distance between the illuminating elements and the optical lens is adjustable so as to produce differing illumination effects from the illuminating elements.

12 Claims, 6 Drawing Sheets

LIGHTING FIXTURE WITH MOISTURE RESISTANT AND ADJUSTABLE ILLUMINATION ARRANGEMENT

BACKGROUND OF THE PRESENT INVENTION

Field of Invention

The present invention relates to lighting equipment, and more particularly to a lighting fixture comprising an adjustable illumination arrangement which is capable of emitting light beams with different angles.

Description of Related Arts

A conventional lighting fixture, such as a ceiling lamp, usually comprises at least one illuminating unit (e.g. LEDs) for delivering illumination to a designated area. The illuminating unit is usually mounted in a housing in an immovable manner so that the light beams coming out from the conventional lighting fixture are fairly fixed and not being able to be adjusted. As such, when illumination requirements change, a user may need to use other accessories to achieve different functions. For example, a specifically-designed lampshade may be mounted to the lighting fixture to achieve special illumination effect, such as altering the angle from which the light beams emit.

In some situations, a user has to adjust the height of the lighting fixture in order to achieve a desirable lighting effect. However, it is not always feasible or economical to adjust the height of the lighting fixture. For example, adjusting the height of the lighting fixture may mean using additional mounting fixtures or additional accessories.

Another disadvantage of conventional lighting fixtures such as those described above is that very often, there exist some sorts of cracks between the main housing and the lampshade or lens elements so that in humid environment, the main housing may develop moisture therein and this may damage the electrical components of the lighting fixtures.

As a result, there is a need to develop a lighting fixture which is capable of emitting light beams with different angles without physically adjusting the height of the main housing.

SUMMARY OF THE PRESENT INVENTION

Certain variations of the present invention provide a lighting fixture comprising a moisture resistant and adjustable illumination arrangement which is capable of emitting light beams with different angles.

Certain variations of the present invention provide a lighting fixture comprising a moisture resistant and adjustable illumination arrangement which is capable of effectively preventing moisture from damaging electrical components of the lighting fixture.

Certain variations of the present invention provide a lighting fixture comprising a moisture resistant and adjustable illumination arrangement, wherein a user is able to conveniently adjust a distance between a lens module and illuminating units so as to alter illuminating performance of the present invention, including the direction of the light beams emitting from the illuminating units.

In one aspect of the present invention, it provides a lighting fixture, comprising:

a main housing having a receiving cavity;

a plurality of illuminating elements mounted in the receiving cavity of the main housing; and a moisture resistant and adjustable illumination arrangement which comprises a lens assembly comprising at least one optical lens positioned corresponding to that of the illuminating elements such that the light beams from the illuminating elements are arranged to pass through the optical lens, the lens assembly being mounted in the receiving cavity of the main housing in a rotatably movable manner such that by rotating the lens assembly with respect to the main housing, a distance between the illuminating elements and the optical lens is adjustable so as to produce differing illumination effects from the illuminating elements.

This summary presented above is provided merely to introduce certain concepts and not to identify any key or essential features of the claimed subject matter.

DETAILED DESCRIPTIONS OF THE PRESENT INVENTION

Figure 1:
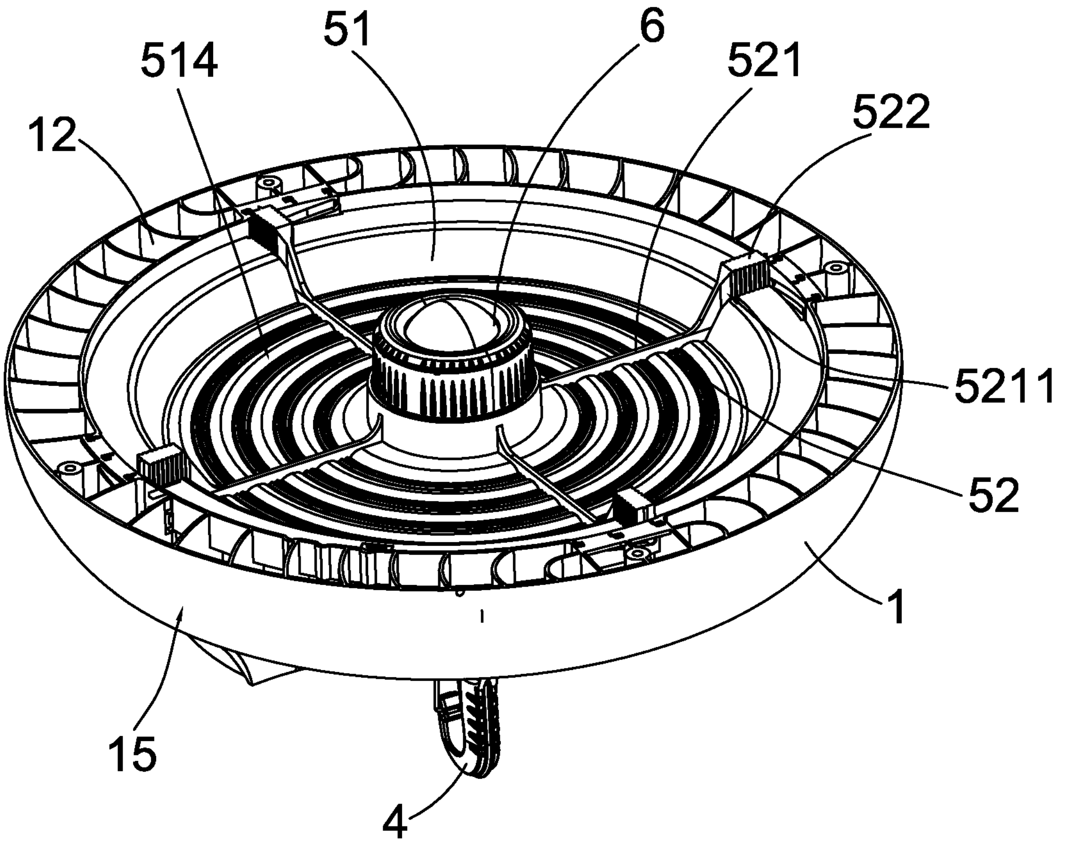
FIG. 1 is a perspective view of a lighting fixture according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 6 of the drawings, a lighting fixture according to a preferred embodiment of the present invention is illustrated. Broadly, the lighting fixture may comprise a main housing 1 having a receiving cavity 101, a plurality of illuminating elements 8, and a moisture resistant and adjustable illumination arrangement 30.

The plurality of illuminating elements 8 may be mounted in the receiving cavity 101 of the main housing 1.

The moisture resistant and adjustable illumination arrangement 30 may comprise a lens assembly 5 positioned corresponding to that of the illuminating elements 8 such that the light beams from the illuminating elements 8 may be arranged to pass through the lens assembly. The lens assembly 5 may be mounted in the receiving cavity 101 of the main housing 1 in a rotatably movable manner such that by rotating the lens assembly 5 with respect to the main housing 1, a vertical distance between the illuminating elements 8 and the lens assembly may be adjustable so as to produce differing lighting and illumination effects from the illuminating elements 8.

According to the preferred embodiment of the present invention, the lighting fixture may be installed on a ceiling. The lighting fixture may further comprise a hook 4 upwardly extending from the main housing 1 for allowing a user to suspendedly hang the lighting fixture on an on the ceiling or any other objects. For the sake of clearer illustration, FIG. 1 to FIG. 5 illustrate the lighting fixture in an upside-down manner, so that the hook 4 may appear underneath the main housing 1. However, FIG. 1 to FIG. 5 illustrate the lighting fixture as viewed from the bottom. Thus, the "up", "upward", "down", "downward" descriptions throughout this specification may actually appear opposite in the drawings, which illustrate an upside-down orientation of the lighting fixture.

The lighting fixture may further comprise a control unit 3 mounted on top of the main housing 1 for controlling an operation of the illuminating elements 8. The hook 4 may extend from the control unit 3. The control unit 3 may comprise a processor for controlling the illuminating elements 8.

Figure 2:
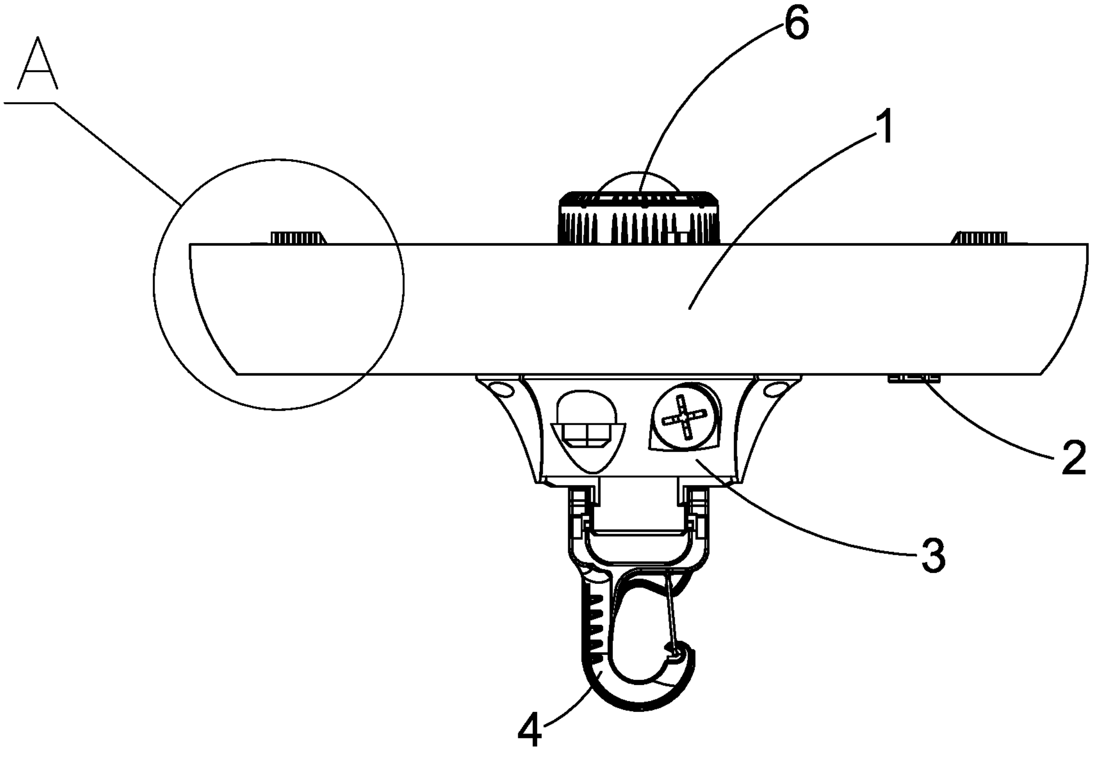
FIG. 2 is a front view of the lighting fixture according to the preferred embodiment of the present invention.
Figure 4:
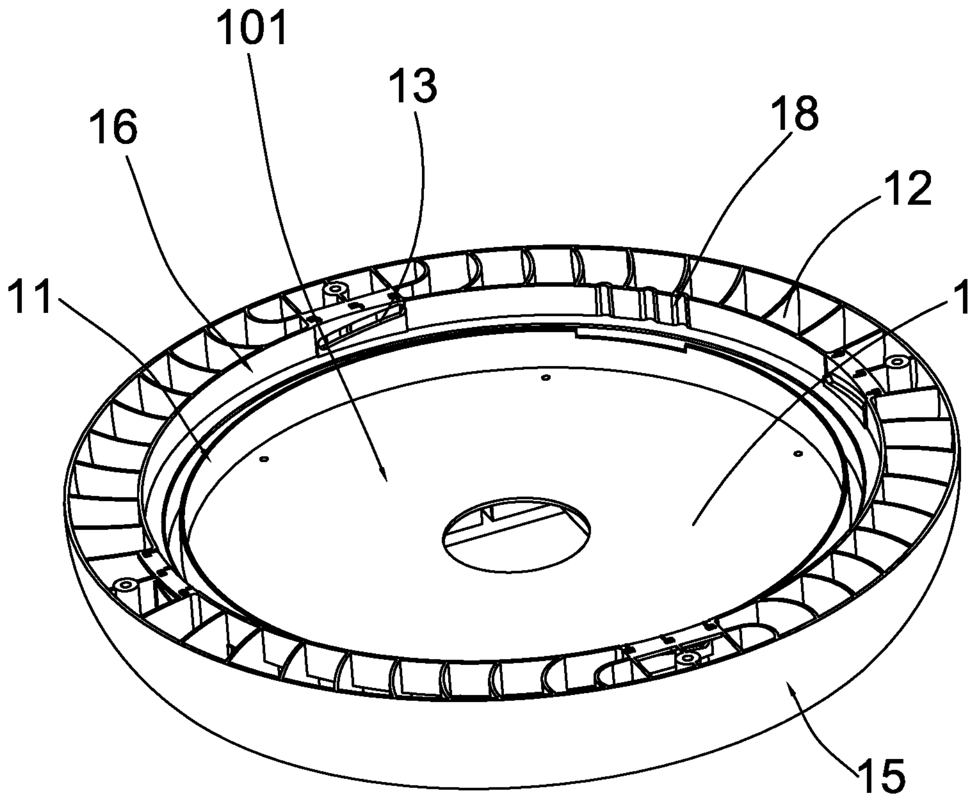
FIG. 4 is a schematic diagram of the lighting fixture according to the preferred embodiment of the present invention.

As shown in FIG. 1 to FIG. 2 and FIG. 4 of the drawings, the main housing 1 may have a substantially circular cross sectional shape and may have a hollow structure formed by the receiving cavity 101. The main housing 1 may have an outer circumferential wall 15 and may comprise a plurality of grid panels 12 inwardly and radially extend from an inner side of the outer circumferential wall 15 in the receiving cavity 101.

The main housing 1 may further have an inner circumferential wall 16 formed in the receiving cavity 101. The inner circumferential wall 16 may be eccentrically formed with respect to the outer circumferential wall 15, wherein the grid panels 12 may be formed between the inner circumferential wall 15 and the inner circumferential wall 16. The grid panels 12 may extend between the outer circumferential wall 15 and the inner circumferential wall 16 to form a grid structure of the main housing 1. The main housing 1 may define a support platform 11 for supporting the lens assembly 5. Moreover, the main housing 1 may further comprise a venting valve 2 for providing ventilation of the receiving cavity 101.

The illuminating elements 8 may be mounted in the receiving cavity 12 of the main housing 1. Each of the illuminating elements 8 may be configured as a LED which is capable of emitting light beams as controlled by the control unit 3. The illuminating elements 8 may be in optical communication with the lens assembly 5. In this preferred embodiment of the present invention, the illuminating elements 8 may be distributed along a circumferential orientation with respect to the main housing 1.

Figure 5:
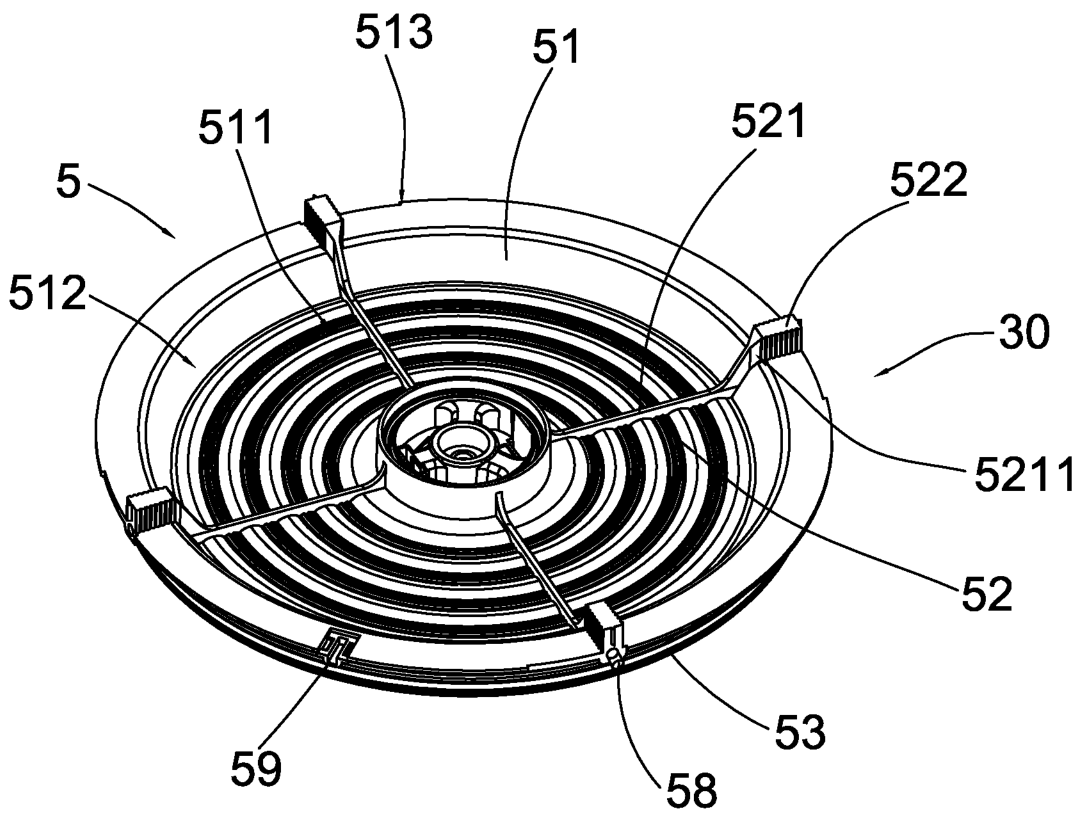
FIG. 5 is a schematic diagram of a lens unit of the lighting fixture according to the preferred embodiment of the present invention.

The moisture resistant and adjustable illumination arrangement 30 may be provided in the main housing 1 for adjustably altering the lighting effects of the lighting fixture. As shown in FIG. 5 of the drawings, the lens assembly 50 may comprise a lens unit 51 and a plurality of adjustment handles 52 extending on the lens unit 51. The lens unit 51 may be configured by transparent material such as glass having a predetermined specific external contour. The lens unit 51 may be in optical communication with the illuminating elements 8 so that the light beams generated by the illuminating elements 8 may be arranged to pass through the lens unit 51.

Figure 3:
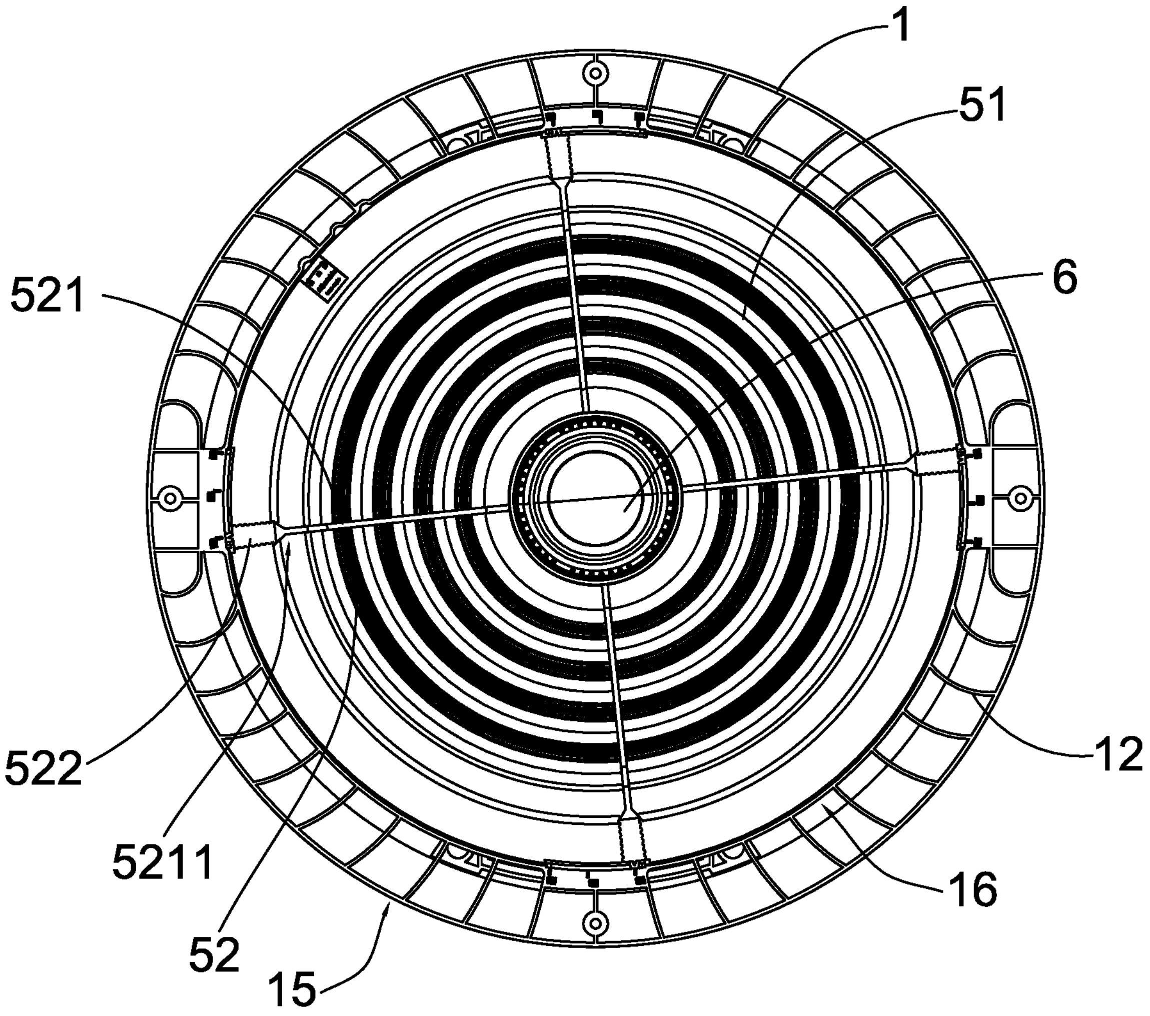
FIG. 3 is a bottom view of the lighting fixture according to the preferred embodiment of the present invention.

According to the preferred embodiment of the present invention, the lens unit 51 may have a generally circular cross sectional shape when viewed from the bottom (see FIG. 3 of the drawings). The lens unit 51 may have a main lens portion 511, an extension lens portion 512 circumferentially and downwardly extending from the main lens portion 511, and a rim portion 513 circumferentially and outwardly extending from the extension lens portion 512. The main lens portion 511, the extension lens portion 512 and the rim portion 513 may form an integral body and may have shape resembling a plate as shown in FIG. 5 of the drawings.

Figure 6:
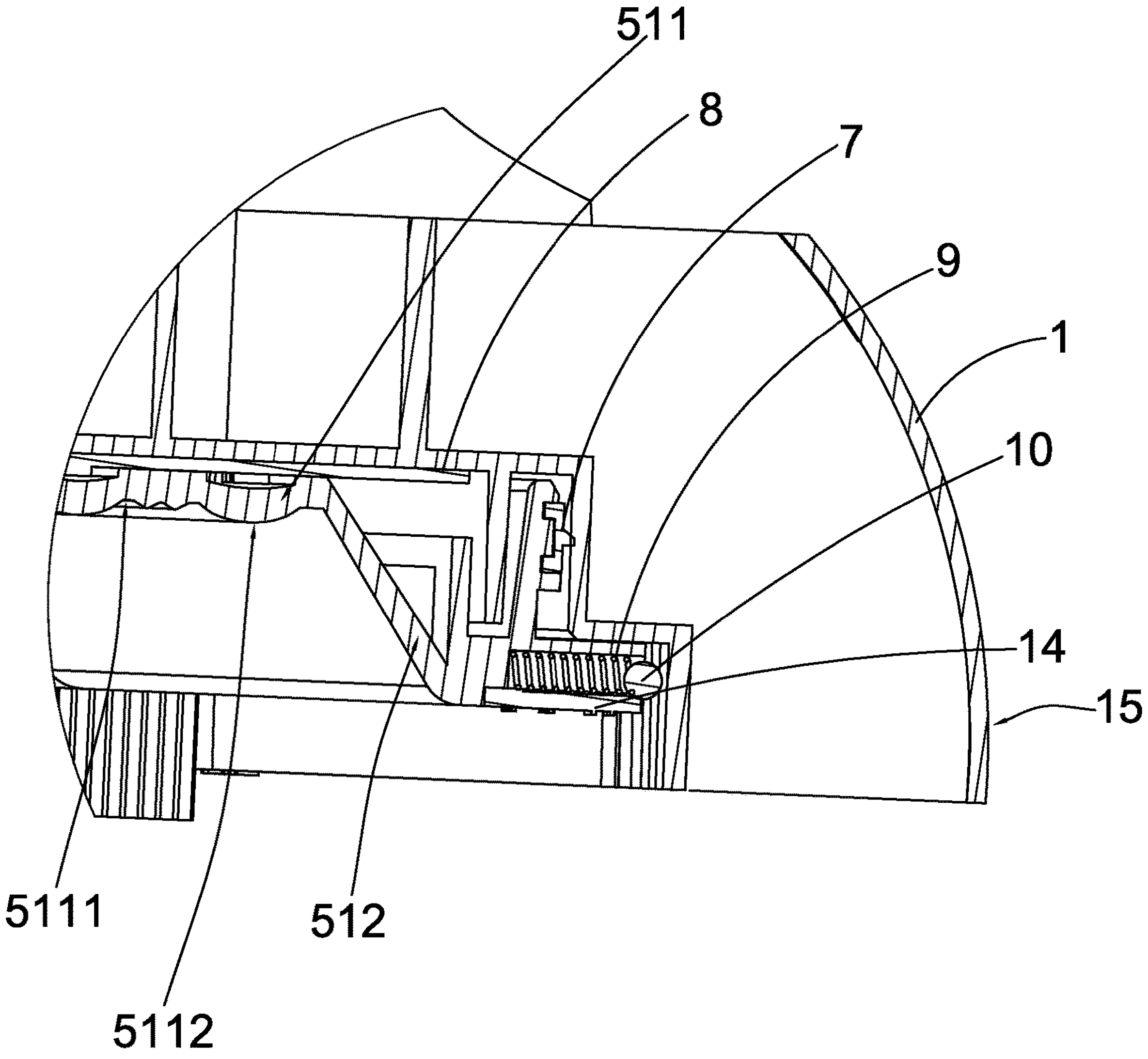
FIG. 6 is a partially sectional side view of FIG. 2.

The main lens portion 511 may have a plurality of annular concave sections 5111 and a plurality of annular convex sections 5112 formed in an alternate manner so as to form a wavy cross-sectional shape as shown in FIG. 6 of the drawings. The annular concave sections 5111 and the annular convex sections 5112 may provide different optical effects to the light beams emitting out from the illuminating elements 8. As a result, the number and arrangement of the annular concave sections 5111 and the annular convex sections 5112 may vary depending on the circumstances in which the present invention is manufactured.

The extension lens portion 512 may circumferentially, downwardly and inclinedly extend from a peripheral side edge of the main lens portion 511. Therefore, a diameter of the extension lens portion 512 may gradually increase from the main lens portion 511 to the rim portion 513. In this way, the lens unit 51 may have a generally tapered cross sectional shape when viewed from the side, as shown in FIG. 6 of the drawings. In this preferred embodiment of the present invention, the illuminating elements 8 may be mounted in the receiving cavity 101 in such a manner that the light beams generated by the illuminating elements 8 may be arranged to pass through the main lens portion 511 and the extension lens portion 512. Thus, by adjusting a distance between the illuminating elements 8 and the main lens portion 511 and the extension lens portion 512 of the lens unit 51, different lighting effects may be obtained. Thus, the lens unit 51 may be provided and mounted in the receiving cavity 101 at a position underneath the illuminating elements 8.

On the other hand, the adjustment handles 52 may be provided on a bottom side 514 of the lens unit 51. Each of the adjustment handles 52 may comprise an extension arm 521 and an actuation member 522 connected to an outer end 5211 of the extension arm 521. Each of the extension arms 521 may extend from the main lens portion 511 (preferably from the center thereof) and pass through the extension lens portion 512. Each of the actuation members 522 may be provided on the outer end of the corresponding extension arm 521 and provided on the rim portion 513. Each of the actuation members 522 may form a protrusion on the rim portion 513 of the lens unit 51 for allowing a user to grab thereon. In practice, a user may rotate the lens unit 51 by exerting a corresponding force against the actuation members 522. According to the preferred embodiment of the present invention, the lens unit 51 may have altogether four adjustment handles 52 wherein each two adjacent adjustment handles 52 may form an approximately 90° angle of inclination, as shown in FIG. 3 of the drawings.

The moisture resistant and adjustable illumination arrangement 30 may further comprise a plurality of guiding panels 13 formed on the inner circumferential wall 16 of the main housing 1 for adjustably engaging with the actuation members 522 of the adjustment handles 52 respectively. Each of the guiding panels 13 may inclinedly extend along the circumference of the inner circumferential wall 16 so as to form a guiding inclination for the corresponding actuation member 522. Accordingly, each of the actuation members 522 may have a protrusion 58 engaging with the corresponding guiding panel 13 so that when the adjustment handles 52 are driven to rotate, the actuation members 522 may follow the extension paths of the guiding panels 13 respectively so as to drive the lens unit 51 to move upwardly or downwardly in the receiving cavity 101. In other words, the guiding panels 13 may be positioned corresponding to that of the actuation members 522. Each of the actuation members 522 may resemble a protrusion downwardly extending from the rim portion 513 of the lens unit 51.

Moreover, the lens unit 51 may further have a plurality of locking slots 59 indently formed on the rim portion 513. On the other hand, the moisture resistant and adjustable illumination arrangement 30 may further comprise a plurality of resilient elements 9 and a plurality of locking rollers 10, wherein each of the locking slots 59 may accommodate a resilient element 9 and a locking roller 10. Each of the resilient elements 9 may be mounted in the corresponding locking slot 59 and bias against the corresponding locking roller 10 supported on a supporting panel 14 in the corresponding locking slot 59. The locking roller 10 may be selectively accommodated in a corresponding retention slot 18 formed on the inner circumferential wall 16 of the main housing 1.

Thus, the main housing 1 may further have a plurality of retention slots 18 formed on the inner circumferential wall 16 of the main housing 1 at positions corresponding to the locking slots 59 respectively so that the locking rollers 10 may be selectively and at least partially accommodated in the retention slots 18 respectively as pushed by the resilient elements 9. The purpose of the locking rollers 10 being selectively and at least partially accommodated in the retention slots 18 is to lock up a position of the lens unit 51 with respect to the main housing 1.

The lighting fixture may further comprise a sensor unit 6 mounted in the main housing 1 and electrically connected to the control unit 3 for controlling an operation of the illuminating elements 8. The sensor unit 6 may be mounted on a central portion of the lens unit 51, wherein the adjustment handles 52 may radially extend from the sensor unit 6. When the sensor unit 6 receives an operation signal, such as a signal emitting from a remote control, the sensor unit 6 may direct the control unit 3 to actuate the illuminating elements 8, such as switching on all of the illuminating elements 8.

The moisture resistant and adjustable illumination arrangement 30 may further comprise a sealing ring 53 embedding a bottom portion of the lens unit 51 for preventing moisture from entering the main housing 1 through the gap between the lens assembly 5 and the main housing 1. As shown in FIG. 5 of the drawings, the sealing ring 53 may be configured as having an annular shape and may be manufactured from waterproof material and may be arranged to fill the gap between the lens assembly 5 and the main housing 1.

As shown in FIG. 6 of the drawings, in order to further enhance moisture resistant performance of the present invention, the moisture resistant and adjustable illumination arrangement 30 may further comprise a sealing support 7 mounted on the main housing 1 at a position corresponding to the sealing ring 53 for supporting the sealing ring 53 and prevent it from being accidentally moved. This arrangement ensures that the sealing ring 53 may be retained in position while the lighting fixture is operating.

The operation of the present invention is as follows: the lens assembly 5 may be mounted in the support platform 11 so that the lens unit 51 may be rotated and move along a vertical direction with respect to the main housing. A user is therefore allowed to grab on the actuation members 52 and rotate the lens unit 51. When the lens unit 51 is driven to rotate, the lens unit 51 will follow the path dictated by the guiding panels 13 and move up or down according to the direction of rotation as described above. The rotation of the lens unit 51 may alter a vertical distance between the illuminating elements 8 and the lens unit 51 so as to create different lighting effects (such as different diffractions) of the lighting fixture. For example, a focal length or the focus of the light beams may be altered and adjusted.

It is worth mentioning that when the actuation members 52 are driven to rotate, the locking rollers 10 may disengage from the corresponding retention slots 18 respectively. The locking rollers 10 may rotate with the lens unit 51 until they reach the adjacent retention slots 18. Meanwhile, the lens unit 51 may move vertically with respect to the main housing 1. The resilient elements 9 may exert biasing force on the locking rollers 10 and push the locking rollers 10 toward the inner circumferential wall 16 to allow the locking rollers 10 to accommodate in the next retention slots 18 respectively. The lens unit 51 may then be secured again and the vertical distance between the illuminating elements 8 and the lens unit 51 is varied to obtain a different light effect. The extent of rotation may depend on the length and shape of the guiding panels 13 and may be varied depending on the circumstances in which the present invention is configured.

As shown in FIG. 1 of the drawings, a plurality of markings (such as arrows) may be formed on the main housing 1 at positions corresponding to the actuation members 52 so as to guide a user of the distance between the illuminating elements 8 and the lens unit 51. The operation of the illuminating elements 8 may be controlled by the control unit 3.

The present invention, while illustrated and described in terms of a preferred embodiment and several alternatives, is not limited to the particular description contained in this specification. Additional alternative or equivalent components could also be used to practice the present invention.

What is claimed is:

1. A lighting fixture, comprising:

a main housing having a receiving cavity;

a plurality of illuminating elements mounted in the receiving cavity of the main housing; and a moisture resistant and adjustable illumination arrangement which comprises a lens assembly comprising at least one optical lens positioned corresponding to that of the illuminating elements such that the light beams from the illuminating elements are arranged to pass through the optical lens, the lens assembly being mounted in the receiving cavity of the main housing in a rotatably movable manner such that by rotating the lens assembly with respect to the main housing, a vertical distance between the illuminating elements and the optical lens is adjustable so as to produce differing illumination effects from the illuminating elements, the lens assembly comprising a lens unit and a plurality of adjustment handles extending on the lens unit, the lens unit being in optical communication with the illuminating elements so that the light beams generated by the illuminating elements are arranged to pass through the lens unit, the lens unit having a main lens portion, an extension lens portion circumferentially extending from the main lens portion, and a rim portion circumferentially and outwardly extending from the extension lens portion, the main lens portion, the extension lens portion and the rim portion forming an integral body, wherein the main lens portion of the lens unit has a plurality of annular concave sections and a plurality of annular convex sections formed in an alternate manner so as to form a wavy cross-sectional shape.

2. The lighting fixture, as recited in claim 1, wherein the extension lens portion circumferentially, downwardly and inclinedly extends from a peripheral side edge of the main lens portion, so that a diameter of the extension lens portion gradually increases from the main lens portion to the rim portion, wherein the illuminating elements are mounted in the receiving cavity in such a manner that the light beams generated by the illuminating elements are arranged to pass through the main lens portion and the extension lens portion.

3. The lighting fixture, as recited in claim 2, wherein the each of the adjustment handles comprises an extension arm and an actuation member connected to an outer end of the extension arm, each of the extension arms extends from the main lens portion and pass through the extension lens portion, each of the actuation members being provided on the outer end of the corresponding extension arm and provided on the rim portion.

4. The lighting fixture, as recited in claim 3, wherein the main housing has an outer circumferential wall, an inner circumferential wall eccentrically formed with respect to the outer circumferential wall in the receiving cavity.

5. The lighting fixture, as recited in claim 4, wherein the moisture resistant and adjustable illumination arrangement further comprises a plurality of guiding panels formed on the inner circumferential wall of the main housing for adjustably engaging with the actuation members of the adjustment handles respectively, each of the guiding panels inclinedly extending along a circumference of the inner circumferential wall so as to form a guiding inclination for the corresponding actuation member, each of the actuation members engaging with the corresponding guiding panel so that when the adjustment handles are driven to rotate, the actuation members is arranged to follow extension paths of the guiding panels respectively so as to drive the lens unit to move vertically in the receiving cavity.

6. The lighting fixture, as recited in claim 5, wherein the lens unit further has a plurality of locking slots indently formed on the rim portion, the moisture resistant and adjustable illumination arrangement further comprising a plurality of resilient elements and a plurality of locking rollers, each of the locking slots being arranged to accommodate one of the resilient element and one of the locking rollers, in such a manner that each of the resilient elements is arranged to bias against the corresponding locking roller supported in the corresponding locking slot, the main housing further having a plurality of retention slots formed on the inner circumferential wall at positions corresponding to the locking slots respectively so that the locking rollers are arranged to selectively and at least partially be accommodated in the retention slots respectively as biased by the resilient elements.

7. A lighting fixture, comprising:

a main housing having a receiving cavity;

a plurality of illuminating elements mounted in the receiving cavity of the main housing; and a moisture resistant and adjustable illumination arrangement which comprises:

a lens assembly comprising at least one optical lens positioned corresponding to that of the illuminating elements such that the light beams from the illuminating elements are arranged to pass through the optical lens, the lens assembly being mounted in the receiving cavity of the main housing in a rotatably movable manner such that by rotating the lens assembly with respect to the main housing, a vertical distance between the illuminating elements and the optical lens is adjustable so as to produce differing illumination effects from the illuminating elements; and a sealing ring embedding a bottom portion of the lens unit for preventing moisture from entering the main housing through the gap between the lens assembly and the main housing, and a sealing support mounted on the main housing at a position corresponding to the sealing ring for supporting the sealing ring and prevent the sealing ring from being accidentally moved.

8. The lighting fixture, as recited in claim 3, wherein the moisture resistant and adjustable illumination arrangement further comprises a sealing ring embedding a bottom portion of the lens unit for preventing moisture from entering the main housing through the gap between the lens assembly and the main housing, and a sealing support mounted on the main housing at a position corresponding to the sealing ring for supporting the sealing ring and prevent the sealing ring from being accidentally moved.

9. The lighting fixture, as recited in claim 6, wherein the moisture resistant and adjustable illumination arrangement further comprises a sealing ring embedding a bottom portion of the lens unit for preventing moisture from entering the main housing through the gap between the lens assembly and the main housing, and a sealing support mounted on the main housing at a position corresponding to the sealing ring for supporting the sealing ring and prevent the sealing ring from being accidentally moved.

10. The lighting fixture, as recited in claim 4, wherein the main housing comprises a plurality of grid panels extending between radially extending between the circumferential wall and the outer circumferential wall to form a grid structure of the main housing.

11. The lighting fixture, as recited in claim 6, wherein the main housing comprises a plurality of grid panels extending between radially extending between the circumferential wall and the outer circumferential wall to form a grid structure of the main housing.

12. The lighting fixture, as recited in claim 9, wherein the main housing comprises a plurality of grid panels extending between radially extending between the circumferential wall and the outer circumferential wall to form a grid structure of the main housing.

* * * * *